(12) United States Patent
Ahlers et al.

(10) Patent No.: US 7,263,079 B2
(45) Date of Patent: Aug. 28, 2007

(54) SYSTEM AND METHODS FOR JOINING THE CORRECT WIRELESS NETWORK

(75) Inventors: Timothy F. Ahlers, Seattle, WA (US); Stephen S. Evans, Kirkland, WA (US); Neal E. Tucker, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 10/902,284

(22) Filed: Jul. 30, 2004

(65) Prior Publication Data

US 2006/0023672 A1 Feb. 2, 2006

(51) Int. Cl.
*H04Q 7/00* (2006.01)
(52) U.S. Cl. .................. 370/328; 370/338; 370/315; 455/418; 455/420; 709/223
(58) Field of Classification Search .............. 370/328, 370/338, 315; 455/418, 420; 709/223
See application file for complete search history.

(56) References Cited

U.S. PATENT DOCUMENTS

| | | | |
|---|---|---|---|
| 6,317,594 | B1 | 11/2001 | Gossman et al. |
| 6,636,490 | B1 * | 10/2003 | Johnson .................. 370/328 |
| 2002/0120750 | A1 | 8/2002 | Nidd |
| 2002/0176366 | A1 | 11/2002 | Ayyagari et al. |
| 2003/0012164 | A1 * | 1/2003 | Mizoguchi et al. ......... 370/338 |
| 2003/0096577 | A1 * | 5/2003 | Heinonen et al. ............ 455/41 |
| 2003/0099221 | A1 * | 5/2003 | Rhee .................. 370/338 |
| 2003/0100308 | A1 | 5/2003 | Rusch |
| 2003/0129966 | A1 | 7/2003 | Le Bars et al. |
| 2003/0217262 | A1 * | 11/2003 | Kawai et al. .............. 713/153 |
| 2004/0053622 | A1 * | 3/2004 | Nakakita et al. ............ 455/450 |
| 2004/0054767 | A1 * | 3/2004 | Karaoguz et al. .......... 709/223 |
| 2004/0120278 | A1 | 6/2004 | Krantz et al. |
| 2004/0127208 | A1 | 7/2004 | Nair et al. |
| 2004/0209622 | A1 * | 10/2004 | Kotzin .................... 455/452.1 |

FOREIGN PATENT DOCUMENTS

WO WO0239484 5/2002

OTHER PUBLICATIONS

"Wireless Provisioning Services Overview," Dec. 2003 (6 pages).
"USB Flash Config Tool Architecture," retrieved May 28, 2005 (2 pages).
"Choicenet Internet Services, LLC," 2002 (1 page)-PO May/2005.
Hayes, Vic, "Tutorial on 802.11 to 802," Mar. 1996 (16 pages).
Ennis, Greg, "802.11 Architecture," Mar. 1996 (10 pages).
U.S. Appl. No. 10/806,369, filed Mar. 23, 2004, Manchester et al.
U.S. Appl. No. 10/806,331, filed Mar. 23, 2004, Manchester et al.

* cited by examiner

*Primary Examiner*—Danh Le
(74) *Attorney, Agent, or Firm*—Lee & Hayes, PLLC

(57) ABSTRACT

A system and methods for joining the correct wireless network are provided. The invention allows a device connecting to an unsecure wireless network to choose the correct network from many available wireless networks which are in range. A piece of code is executed on one of the PCs already on the network, then the device connects to each unsecure wireless network in range and sends a small message. If that message receives a reply from the code running on the PC that is already on the wireless network, that particular wireless network is determined to be the correct wireless network.

14 Claims, 5 Drawing Sheets

SYSTEM AND METHODS FOR JOINING THE CORRECT WIRELESS NETWORK

FIELD OF THE INVENTION

This invention pertains generally to the field of computer networks and more particularly to a mechanism for simplifying the process of joining the correct computer network.

BACKGROUND OF THE INVENTION

The use of data communication networks continues to grow. In small as well as large corporate settings, wired local area networks (LANs) and wide area networks (WANs) have become an established feature of conducting business, and wireless networks are being increasingly employed. The use of network technology in the home, both wired and wireless, is a more recent phenomenon and has been slower to develop. In addition to facilitating Internet connectivity, home networking permits personal computing devices and various consumer electronic devices and appliances within the home to communicate with each other. Wireless technology, such as IEEE 802.11 wireless networks and networks of Bluetooth-enabled devices, is attractive in home as well as corporate environments for reasons of convenience, mobility and flexibility.

A principal impediment to the wider adoption of networking technology in the home and other non-corporate environments has been the difficulty experienced by non-expert users in configuring network devices for use on pre-existing wireless networks. Often users do not know or remember their wireless network connection information. In these cases, the user has to go back to the PC and log into the wireless access point's (WAP) configuration utility to determine the network settings. Even this can be problematic because the configuration utility often requires you to enter a user name and password, which are generally set by the manufacturer. Most users would be forced to look in the documentation that came with the WAP, or consult the WAP manufacturer's website.

Thus, initial setup of a wireless network is difficult even for those familiar with the technology. Connecting to an existing wireless network is also difficult because, even if the network is purposefully unsecure (unprotected, unencrypted), there may be multiple wireless networks within range of the PC or device trying to connect to the wireless network. Thus, the device does not know which network to join. The problem is exacerbated when the wireless device is a thin client device, possessing limited means for input and therefore preventing the user from manually selecting the correct wireless network. Accordingly, there is a need to simplify the procedure for additional devices to find and join the correct wireless network.

BRIEF SUMMARY OF THE INVENTION

In view of the foregoing, one embodiment of the present invention provides a method for automatically joining a correct wireless network from among a plurality of detected wireless networks, the method comprising detecting a first wireless network, joining the first wireless network, broadcasting a message on the first wireless network, determining that the first wireless network is the correct wireless network if an expected response to the message is received from a device on the first wireless network, and determining that the first wireless network is not the correct wireless network if the expected response to the message is not received.

In keeping with the features of the invention, after determining that the first network is not the correct network, a search is initiated to locate the correct network. The search process comprises (1) detecting another wireless network, (2) joining the other wireless network, (3) broadcasting the message on the other wireless network, and (4) deciding whether the other wireless network is the correct network by determining whether the response to the broadcast message is the expected response. The search process repeats for each available wireless network until the correct wireless network is determined. The plurality of wireless networks may be unsecure wireless networks. The expected response may include a unique identifier. Determining that the different wireless network is not the correct wireless network may include waiting for the expected response for a predetermined amount of time.

In keeping with another aspect of the invention, a wireless device system is automatically joined to the identified correct wireless network The wireless device includes a wireless transmitter/receiver, wherein the wireless device iteratively joins each of the plurality detected wireless networks and broadcasts a message on each of the plurality detected wireless networks until the correct wireless network is determined. A portable computer-readable media device associated with the wireless device includes instructions for instructing a computer system connected to the correct wireless network to listen on the correct wireless network for the message, and to broadcast a response to the message on the correct wireless network. The wireless device is associated with a unique identifier made available to a user. The portable computer-readable media device includes instructions for instructing the computer system to prompt the user for the unique identifier and include the unique identifier in the response, which will then result in the automatic connection of the device to the wireless network.

Yet another embodiment of the invention provides a method for connecting a wireless device to a correct wireless network from among a plurality of available wireless networks. The method comprises (1) installing a wireless device within range of the correct wireless network, wherein the wireless device iteratively joins each of the available wireless networks and broadcasts a message on each of the available wireless networks, and (2) installing a portable computer-readable media device in a computer connected to the correct wireless network, wherein the portable computer-readable media device causes the computer to listen for the message on the correct wireless network, and to transmit a response to the message on the correct wireless network to the wireless device. The wireless device determines the correct wireless network by receiving the response on the correct wireless network. The method may further comprise obtaining a unique identifier from the wireless device, and entering the unique identifier in the computer when prompted for the unique identifier, wherein the computer includes the unique identifier in the response.

Additional features and advantages of the invention are made apparent from the following detailed description of illustrative embodiments that proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1A:
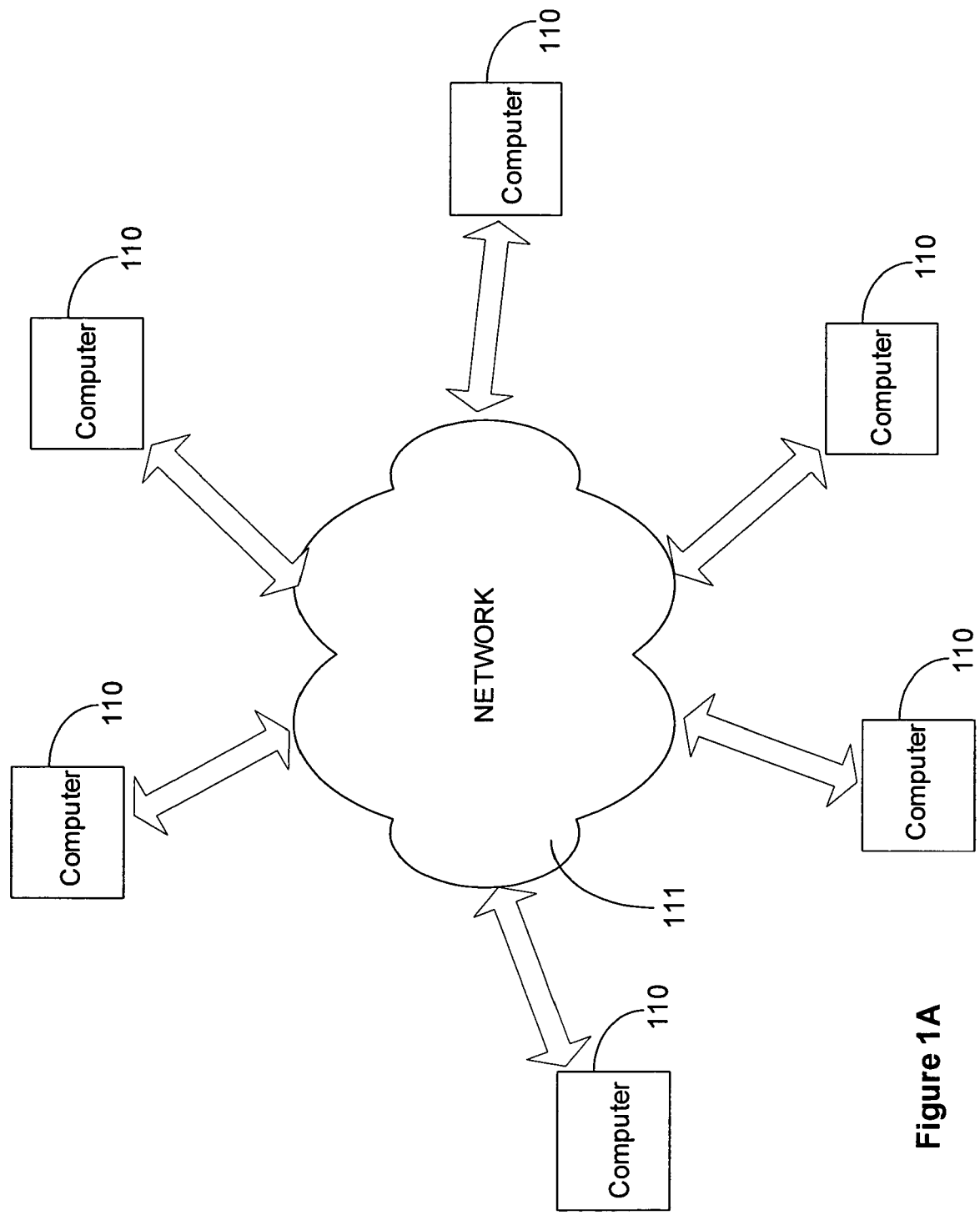
FIG. 1A is a schematic generally illustrating an exemplary network environment across which the present invention operates.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures are where data are maintained and are physical locations of the memory having particular properties defined by the format of the data. However, while the invention is being described in the foregoing context, it is not meant to be limiting as those of skill in the art will appreciate that the various acts and operations described hereinafter may also be implemented in hardware.

An example of a networked environment in which the invention may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, or peers with respect to other computers. Accordingly, the various embodiments of the invention may be practiced on clients, network servers, peers, or combinations thereof, even though specific examples contained herein do not refer to all of these types of computers.

Figure 1B:
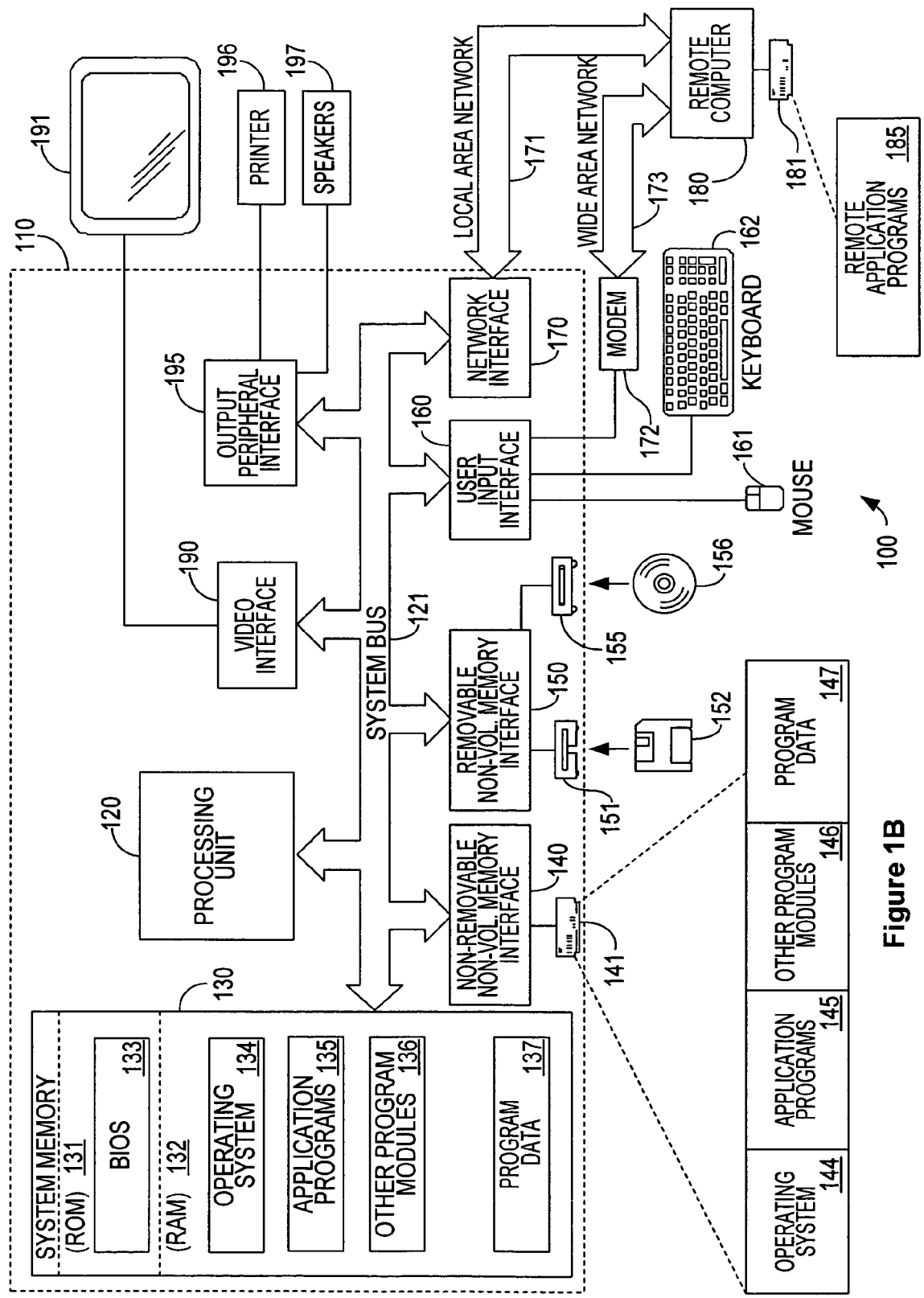
FIG. 1B is a block diagram generally illustrating an exemplary computer system on which the present invention resides.

FIG. 1B illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG. 1B, an exemplary system for implementing the invention includes a general-purpose computing device in the form of a computer 110, which may act as a client, network server, quarantine server, or peer within the context of the invention. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 operates in a networked environment using logical connections to one or more remote computers, such as a remote computer 180. The remote computer 180 may be a personal computer, a server, a router, a network PC, a peer device, or other common network node and typically includes many or all of the elements described above relative to the personal computer 110 although only a memory storage device 181 has been illustrated in FIG. 1B. The logical connections depicted in FIG. 1B include a local area network (LAN) 171 and a wide area network (WAN) 173 but may also include other networks. Such networking environments are commonplace in offices, enterprise-wide computer networks, intranets, and the Internet. Furthermore, LAN 171 includes both wired and wireless connections.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

In a typical scenario where the invention is practiced, the user has an unsecure wireless network installed and running. In one embodiment, the wireless network is an IEEE 802.11 standard wireless network. A device such as a personal computer (PC) is connected to the wireless network through an Ethernet connection. A user brings home a new device that they would like to connect to the wireless network. The user powers up the device, which then starts looking for wireless networks. For example, the device may detect multiple secure and unsecure networks. The device could connect to any of the unsecure networks, but presumably the user wants to connect it to the user's own wireless network. The device begins automatically scanning through the unsecure wireless networks. It tunes to a wireless network, and then sends out a broadcast message on that network and waits for a response. If no response is received after a certain time, the device tunes to the next network and repeats the process. When it reaches the end of the list of unsecure wireless networks, the device returns to the top of the list and starts over.

A portable computer-readable media device is provided with the wireless device. In one embodiment, the portable computer-readable media device is a compact disk (CD). In another embodiment, the portable computer-readable media device is a universal serial bus (USB) flash drive. While the device is scanning, after setting up the device, the user installs the CD in the PC. Software on the CD executes and causes the PC to start listening for broadcast messages of a specific type. Eventually, the wireless device will connect to the actual wireless network that this PC is connected to and send the broadcast message. The software running on the PC receives the message and replies back to the device. The device now knows that it has found the correct wireless network and additional setup processes can take place (if necessary) now that the wireless device and the PC are on the same network.

Figure 2:
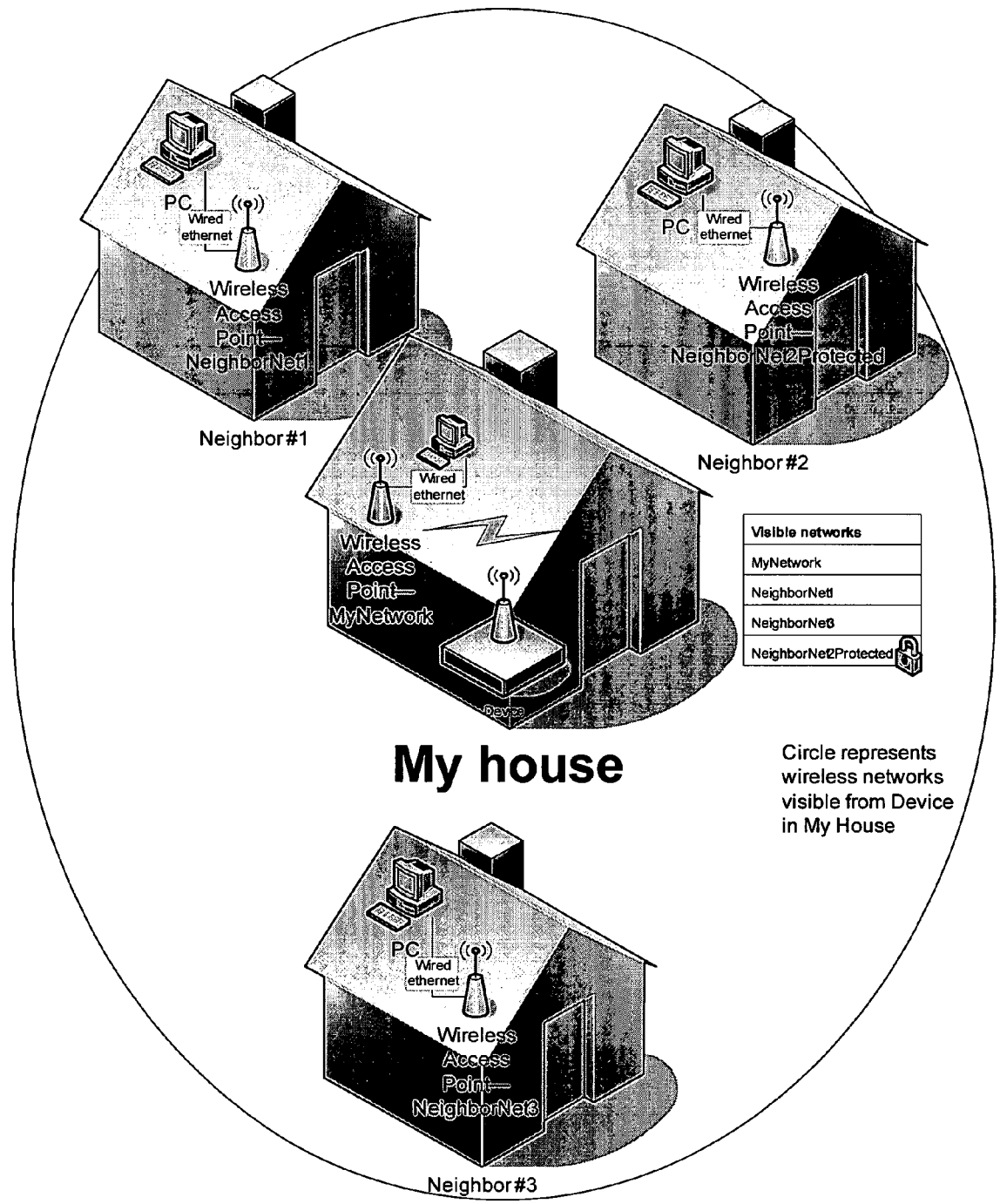
FIG. 2 is an illustration of a typical scenario where the invention is used.

Turning to FIG. 2, the invention is now described in greater detail. FIG. 2 illustrates four home networks (such as the network shown in FIG. 1a), each comprising at least a PC (such as the computing system shown in FIG. 1b) and a wireless access point (WAP). In one embodiment, a PC is connected to a WAP via an Ethernet connection. In other embodiments, the PC may be connected to the WAP via other wired connections such as a USB connection, or wireless connections such as an IEEE 802.11 standard connection. A user's wireless network is labeled "MyNetwork" and is located in "My House." Surrounding wireless networks that are within range of My House include the unsecure wireless network "NeighborNet1" in the house labeled "Neighbor #1," the secure wireless network "NeighborNet2" in the house labeled "Neighbor #2," and the unsecure wireless network "NeighborNet3" in the house labeled "Neighbor #3." The user has a wireless device, including a wireless transmitter/receiver, labeled "device" that is to join MyNetwork. When the wireless device looks for wireless networks to join, MyNetwork, NeighborNet1, NeighborNet2, and NeighborNet3 are visible. However, because NeighborNet2 is a secure network, the wireless device cannot join that network unless configured with the appropriate network encryption key.

Figure 3:
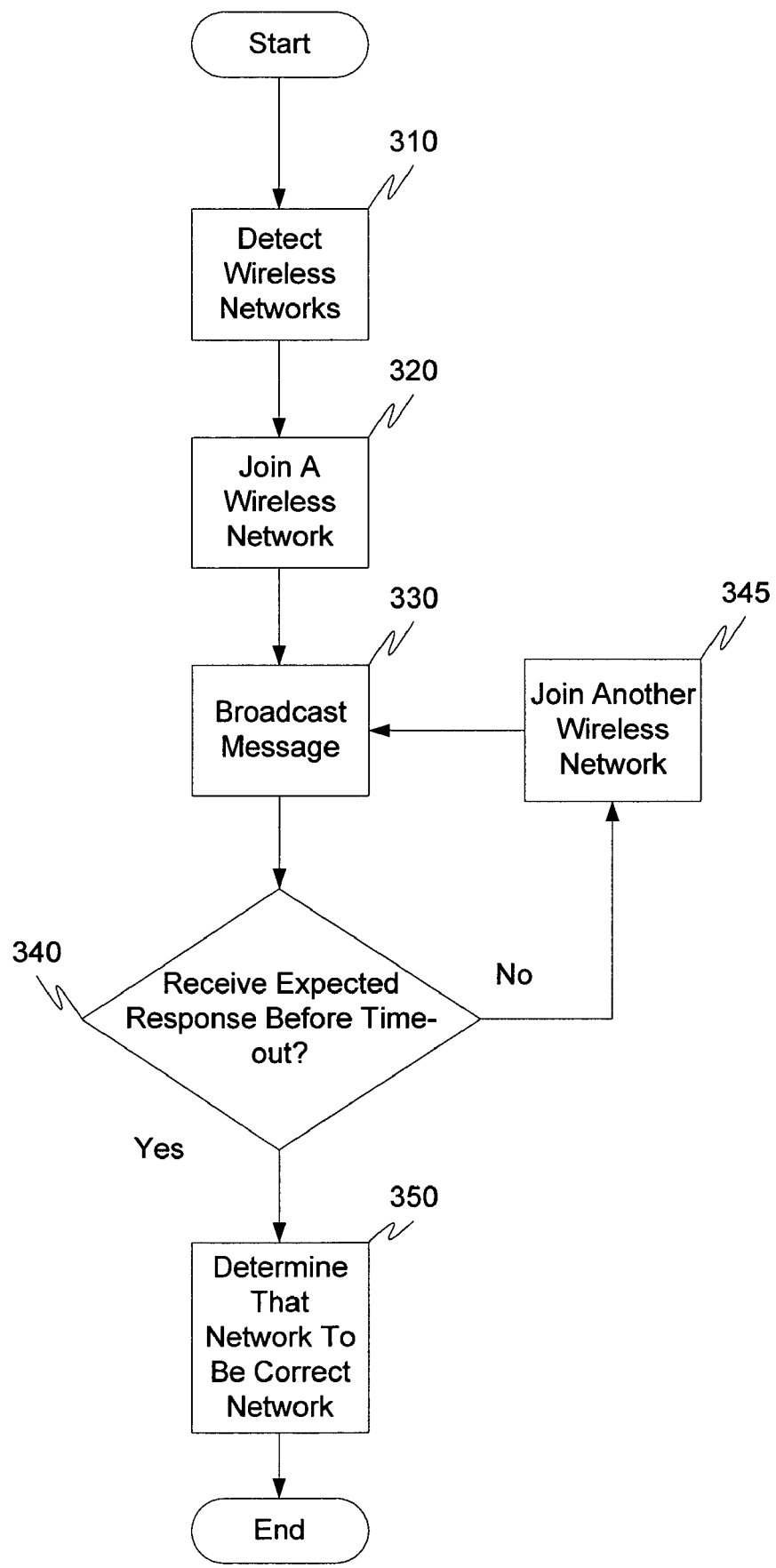
FIG. 3 is a flow diagram illustrating the procedure for a wireless device to find the correct wireless network to join.

FIG. 3 illustrates the procedure followed by the device once it is powered on. At step 310, the wireless device detects all available wireless networks. For example, the device may detect that it can join MyNetwork, NeighborNet1, and/or NeighborNet3. At step 320, the device picks a network from the available networks, for example NeighborNet1, and joins the network by obtaining an internet protocol (IP) address from the network. At step 330, the wireless device broadcasts a message that is specific to device over NeighborNet1. At step 340, the wireless device waits for a predetermined amount of time, for example 30 seconds, for a response to the message from a PC on the correct network. If no response is received before timing out, the wireless device determines the NeighborNet1 is not the correct network. At step 345 the wireless devices joins another wireless network from the list of available networks, for example MyNetwork. Again the wireless device broadcasts the device-specific message over MyNetwork at step 330. In this instance, the wireless device does receive a response from a PC on the correct network at step 340. The wireless device then determines that MyNetwork is the correct network at step 350 because the response is a predetermined answer to the broadcast message of step 330.

Figure 4:
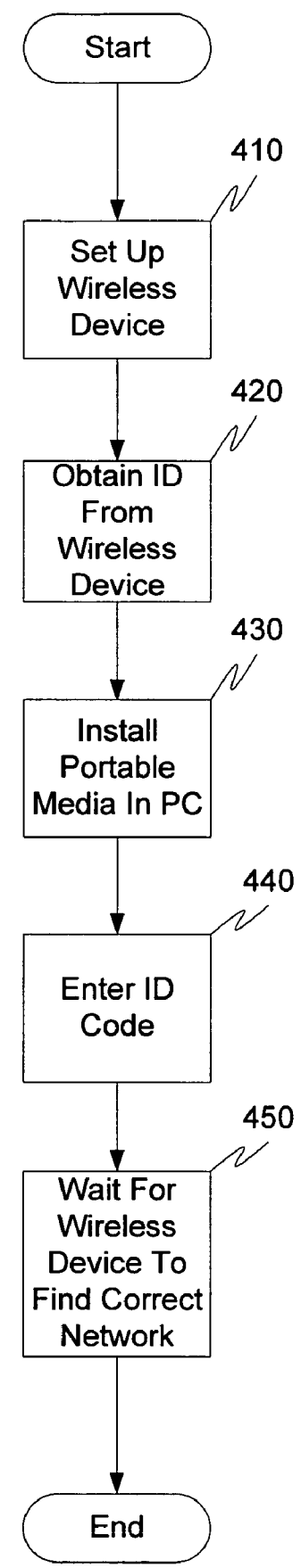
FIG. 4 is a flow diagram illustrating the procedure for a user to allow the wireless device to find the correct wireless network.

FIG. 4 illustrates the procedure followed by the user to allow the wireless device to find the correct wireless network. At step 410 the wireless device is powered on and set up to scan for available wireless networks. In one embodiment, the user may obtain a device identifier from the wireless device at step 420. While the wireless device is scanning, the user installs a portable computer-readable media device (e.g., a CD), which is associated to the wireless device, into a PC on the correct wireless network (e.g. MyNetwork in FIG. 2) at step 430. Where the user has obtained a device identifier from the wireless device, software on the CD may prompt the user to enter that identifier into the PC at step 440.

Software on the CD executes on the PC and causes the PC to start listening for the device-specific broadcast message of the wireless device on MyNetwork. At step 450, the user waits for the wireless device to begin broadcasting the device-specific message on MyNetwork. When the wireless device does begins broadcasting on MyNetwork, the software executing on the PC recognizes the device-specific message, and transmits a predetermined response to the wireless device. The wireless device uses receipt of this response to determine that it has found the correct wireless network. In one embodiment, the device identifier is included in the response to verify the authenticity of the wireless network. In another embodiment, the device identifier is sent in a separate message that is a response to the wireless device's request for the identifier.

In the various embodiments of the invention the wireless device is a wireless device running on the Microsoft Windows® WinCE Operating System, though the wireless device may be any device capable of connection to a wireless network. Likewise, the device first connected to the correct wireless network is a PC running on the Microsoft Windows® Operating System, but may be any device capable of connecting to a wireless network and executing code received from a portable media device.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for automatically joining a correct wireless network from among a plurality of wireless networks, the method comprising:
   initiating an automatic sequence for joining a device to a wireless network, where the sequence comprises; (a) detecting one of the plurality of wireless networks wireless network, where at least one node on the detected network is a computer; (b) joining the wireless network as an additional node; (c) broadcasting a message on the wireless network from the additional node; and (d) determining at the additional node whether the wireless network is the correct wireless network based on the network's response to the broadcast message; and
   automatically repeating the sequence for different ones of the plurality of wireless networks until the correct wireless network is identified.

2. The method of claim 1 wherein the wireless network is a first wireless network, the method further comprising:
   after determining that the first wireless network is not the correct network, repeating a search process comprising detecting a different wireless network,
      joining the different wireless network,
      broadcasting the message on the different wireless network;
      determining that the different wireless network is the correct wireless network if the expected response to the message is received from a device on the different wireless network, and
      determining that the different wireless network is not the correct wireless network if the expected response to the message is not received; and
   ceasing the search process after the correct wireless network is determined.

3. The method of claim 1 wherein the plurality of wireless networks are unsecure wireless networks.

4. The method of claim 1, further comprising executing a configuration procedure after the correct wireless network is determined.

5. The method of claim 2, further comprising executing a configuration procedure after the correct wireless network is determined.

6. The method of claim 1, wherein determining that the different wireless network is the correct wireless network includes receiving a unique identifier from the computer.

7. The method of claim 1, wherein determining that the different wireless network is not the correct wireless network includes waiting for the expected response for a predetermined amount of time.

8. A wireless device system for automatically joining a correct wireless network from among a plurality of detected wireless networks, comprising:
   a wireless device including a wireless transmitter/receiver, wherein the wireless device iteratively joins each of the plurality detected wireless networks and broadcasts a message on each of the plurality detected wireless networks until the correct wireless network is determined; and
   a portable computer-readable media device associated with the wireless device, wherein the portable computer-readable media device includes instructions for instructing a computer system connected to the correct wireless network to listen on the correct wireless network for the message, and to broadcast a response to the message on the correct wireless network.

9. The wireless device system of claim 8, wherein the plurality of detected wireless networks are unsecure wireless networks.

10. The wireless device system of claim 8, wherein the wireless device is associated with a unique identifier made available to a user, and the portable computer-readable media device further includes instructions for instructing the computer system to prompt the user for the unique identifier and supply the unique identifier to the wireless device.

11. A method for connecting a wireless device to a correct wireless network from among a plurality of available wireless networks, comprising:
    installing a wireless device within range of the correct wireless network, wherein the wireless device iteratively joins each of the available wireless networks and broadcasts a message on each of the available wireless networks; and
    installing a portable computer-readable media device in a computer connected to the correct wireless network, wherein the portable computer-readable media device causes the computer to listen for the message on the correct wireless network, and to transmit a response to the message on the correct wireless network to the wireless device.

12. The method of claim 11, wherein the wireless device determines the correct wireless network by receiving the response on the correct wireless network.

13. The method of claim 11, wherein the plurality of available wireless networks are unsecure wireless networks.

14. The method of claim 11, further comprising:
    obtaining a unique identifier from the wireless device; and
    entering the unique identifier in the computer when prompted for the unique identifier, wherein the computer supplies the unique identifier to the wireless device.

* * * * *